US009317340B2

(12) United States Patent
Abali et al.

(10) Patent No.: US 9,317,340 B2
(45) Date of Patent: Apr. 19, 2016

(54) INTELLIGENT VIRTUAL MACHINE (VM) RE-LOCATION

(71) Applicant: International Business Machines Corporation, Armonk, NY (US)

(72) Inventors: Bulent Abali, Tenafly, NJ (US); Makoto Ono, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 122 days.

(21) Appl. No.: 14/106,914

(22) Filed: Dec. 16, 2013

(65) Prior Publication Data

US 2015/0169337 A1    Jun. 18, 2015

(51) Int. Cl.
*G06F 9/46* (2006.01)
*G06F 9/455* (2006.01)
*G06F 9/50* (2006.01)
*G06F 9/48* (2006.01)

(52) U.S. Cl.
CPC ............. *G06F 9/5088* (2013.01); *G06F 9/48* (2013.01); *G06F 9/50* (2013.01)

(58) Field of Classification Search
CPC ...................................... G06F 9/48; G06F 9/50
See application file for complete search history.

(56) References Cited

U.S. PATENT DOCUMENTS

| 8,943,499 | B2 * | 1/2015 | Turner et al. ............. 718/1 |
| 2012/0042311 | A1 | 2/2012 | Biran et al. |
| 2012/0254860 | A1 * | 10/2012 | Bozek et al. ............. 718/1 |

OTHER PUBLICATIONS

Wu, et al., "NetDEO: automating network design, evolution, and optimization," IEEE, 2012.

* cited by examiner

*Primary Examiner* — Camquy Truong
(74) *Attorney, Agent, or Firm* — Steven M. Greenberg, Esq.; CRGO Law

(57) ABSTRACT

Embodiments of the invention provide a method, system and computer program product for re-locating virtual machines (VM) in a data center environment. In an embodiment of the invention, a method for intelligent VM relocation includes selecting a set of VMs for relocation over a data communications network within a data center from one or more source physical machines to one or more target physical machines. The method also includes computing in memory of a computer in the data center a VM mobility cost for relocating the set of the VMs. The method yet further includes determining whether or not the VM mobility cost exceeds available resources in the data communications network. Finally, the method includes relocating the set of the VMs only it is determined that the VM mobility cost does not exceed the available resources of the data communications network.

13 Claims, 2 Drawing Sheets

INTELLIGENT VIRTUAL MACHINE (VM) RE-LOCATION

BACKGROUND OF THE INVENTION

1. Field of the Invention

The present invention relates to virtualization and more particularly to VM relocation.

2. Description of the Related Art

Until recently, a host computing environment included a hardware infrastructure of processor core, input/output, memory and fixed storage, the combination of which supported an operating system, which in turn supported the execution of a single application at a time. Gradually, as processor power increased, advanced forms of the operating system enabled both simulated and actual multi-tasking such that multiple applications could execute within the same host computing environment.

Initially, applications were self contained bundles of logic relying on little other than core object files and related resource files. As computing become integral to modern industry, however, applications became co-dependent on the presence of other applications such that the requisite environment for an application included not only the underlying operating system and supporting hardware platform, but also other key applications including application servers, database management servers, collaboration servers and communicative logic commonly referred to as middleware. Given the complexity of application and platform interoperability, however, different combinations of applications executing in a single hardware platform can demonstrate differing degrees of performance and stability.

Virtualization, and specifically virtualized (host) machines, as a technology aims to interject a layer between the hardware platform and operating system and executing applications. From the perspective of business continuity and disaster recovery, virtualization provides a portable computing environment. Specifically, moving an entire environment configured with multiple different applications is a matter of moving a virtual machine (VM) from one supporting host server computer to another. Further, more powerful host server computers can support the coexistence of multiple different VMs therein, all the while maintaining a virtual separation between the VMs. Consequently, a failure condition in one VM cannot jeopardize the integrity of other co-executing VM in the same host server computer.

In a data center environment, multiple VMs are deployed in multiple host server computers to satisfy computing demand present in the data center. As such, load balancing is of paramount importance in the data center with respect to the placement of VMs in specific host server computers. For instance, when entire system utilization is low, relocating individual VMs to a reduced number of host server computers and powering off remaining host server computers can reduce data center energy consumption. Yet, due to insufficient network bandwidth required to relocate VMs from host server computer to host server computer, VM relocation as a strategy may not be possible.

Notably, to relocate a VM to a target host server computer, two cost factors are to be considered: (1) VM running cost and (2) VM mobility cost (i.e. relocation cost). VM running cost is the cost of executing the VM in the target host server computer including CPU utilization, memory utilization, and other resource utilization. VM mobility cost is the cost to move the VM to the target host server computer. The VM mobility cost is generally influenced both by available network bandwidth and the workload writes to the VM memory which must be transferred across the network to the target host server computer during VM relocation. The rate of writes to the memory is referred to as the "memory dirtying rate". Dirty pages must be transferred from source server to the target server during VM relocation. A VM with higher dirtying rate implies higher network traffic hence higher VM mobility cost for that particular VM. However, at present, VM relocation tools do not consider the VM mobility cost during VM relocation. Rather, contemporary VM relocation tools only relocate VMs based on VM running cost and system status including memory capacity, CPU utilization, energy consumption, and given policy.

BRIEF SUMMARY OF THE INVENTION

Embodiments of the present invention address deficiencies of the art in respect to VM management and provide a novel and non-obvious method, system and computer program product for re-locating VMs in a data center environment. In an embodiment of the invention, a method for intelligent VM relocation is provided. The method includes selecting a set of VMs for relocation over a data communications network within a data center from one or more source physical machines to one or more target physical machines. The method also includes computing in memory of a computer in the data center a VM mobility cost for relocating the set of the VMs. The method yet further includes determining whether or not the VM mobility cost exceeds available resources in the data communications network. Finally, the method includes relocating the set of the VMs only when it is determined that the VM mobility cost does not exceed the available resources of the data communications network.

In one aspect of the embodiment, the VM mobility cost includes expected network bandwidth utilization when relocating the VMs. In another aspect of the embodiment, the VM mobility cost additionally includes an expected page dirtying rate for each of the VMs. In yet another aspect of the embodiment, the VM mobility cost even yet further includes an expected throughput determined according to a network topology identified for the data communications network. Finally, in even yet another aspect of the embodiment, the VMs are relocated utilizing optimization algorithm such as binpacking. In the binpacking optimization problem, as commonly known in computer science, objects of different sizes or properties are packed in to bins in a way to minimize the number of bins. For example, when binpacking, a list of target physical machines to which the VMs are able to be relocated can be generated and the VM mobility cost computed for the VMs in respect to each of the target physical machines. The list can be sorted based upon the computed VM mobility cost for each of the target physical machines and the VMs can be binpacked into the target physical machines based on VM running cost in an order specified by the sorted list.

In another embodiment of the invention, a VM utilizing data processing system can be configured for intelligent VM relocation. The system can include multiple different physical machines, each having a configuration to host one or more VMs, each being communicatively coupled to the other over a data communications network. The system also can include an intelligent VM relocation module executing in memory of a computer. The module can include program code enabled during execution to select a set of VMs for relocation over the data communications network from one or more source ones of the physical machines to one or more target ones of the physical machines, to compute in memory of the computer a VM mobility cost for relocating the set of the VMs, to determine whether or not the VM mobility cost exceeds available resources in the data communications network, and to relocate the set of the VMs only it is determined that the VM mobility cost does not exceed the available resources of the data communications network.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for intelligent VM relocation. In accordance with an embodiment of the invention, a VM mobility cost can be computed for each VM selected for relocation over a data communications network from a source physical machine to a target physical machine both disposed within a data center. Thereafter, for each VM selected for relocation, it can be determined if the VM mobility cost exceeds available resources in the data communications network. Only if for each VM selected for relocation it is determined that the VM mobility cost does not exceed the available resources will the VM be relocated from the source physical machine to the target physical machine. Optionally, multiple ones of the VMs selected for relocation can be relocated to a selection of target physical machines utilizing binpacking computed in accordance with expected VM running cost and in accordance with the expected VM mobility cost of relocating each VM selected for relocation to different ones of the target physical machines.

Figure 1:
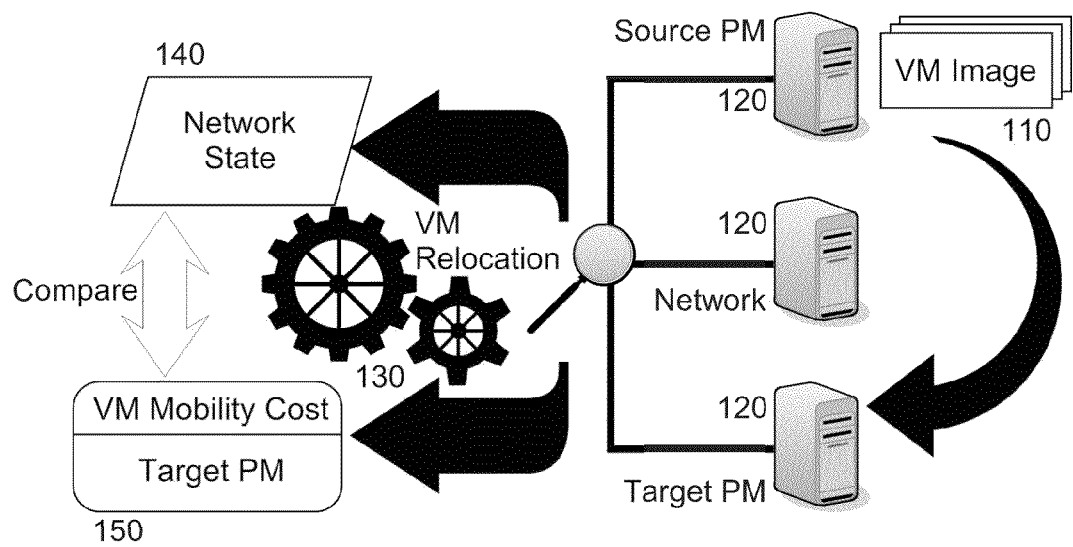
FIG. 1 is a pictorial illustration of a process for intelligent VM relocation.

In further illustration, FIG. 1 is a pictorial illustration of a process for intelligent VM relocation. As shown in FIG. 1, VM relocation logic 130 can determine whether or not to relocate one or more VMs 110 from a source one of a set of physical machines 120 to a target one of the physical machines 120 coupled to one another over a network in a data center. In particular, the VM relocation logic 130 in determining whether or not to relocate the VMs 110 can consider the VM mobility cost 150 in relocating the VMs 110 to the target one of the physical machines 120.

In a broad sense of the process for intelligent VM relocation, in response to selecting the VMs 110 for relocation from the source one of a set of physical machines 120 to the target one of the physical machines 120, the VM relocation logic 130 can compute both the expected VM running cost and the expected VM mobility cost 150. Thereafter, the VM relocation logic 130 can compare the computed VM running cost to the available resource of the target physical machine, and the computed VM mobility cost 150 to the available resources 140 of the network. To the extent that the computed VM running cost does not exceed the available resource and the computed VM mobility cost 150 does not exceed the available resources 140, the VMs 110 can be relocated to the target one of the physical machines.

Figure 2:
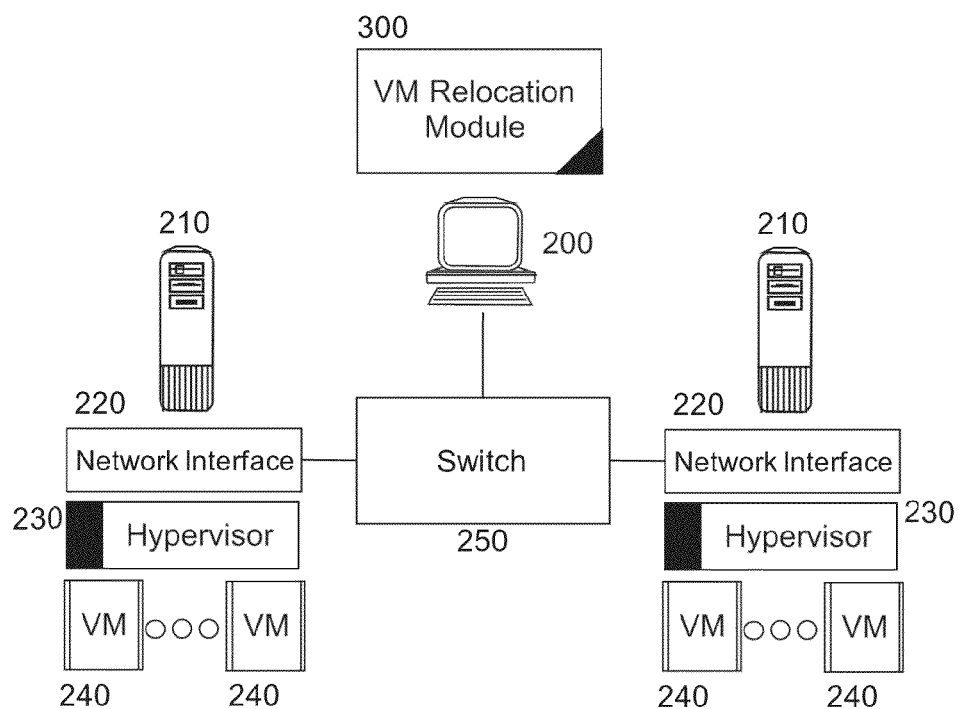
FIG. 2 is a schematic illustration of a VM utilizing data processing system configured for intelligent VM relocation; and, FIG. 3 is a flow chart illustrating a process for intelligent VM relocation.

Of note, the process described in connection with FIG. 1 can be implemented in a VM utilizing data processing system, generally disposed within a data center. In more particularly illustration, FIG. 2 schematically shows a VM utilizing data processing system configured for intelligent VM relocation. The system can include a set of physical machines 210 coupled to one another over a data communications network (only two of the physical machines 210 shown for ease of illustration). Each of the physical machines 210 can include a hypervisor 230 managing the operation of one or more VMs 240.

Data traffic from each of the VMs 240 can pass through corresponding ones of the physical machines 210 by way of a network interface 220 and through one or more switches 250 managing data traffic in the data communications network (only a single switch shown for ease of illustration). As it will be apparent to the skilled artisan, the physical machines 210 can be arranged with respect to one another either through a common single one of the switches 250, or through multiple different ones of the switches 250 such that the physical machines 210 are arranged hierarchically.

A host computer 200 also can be coupled to the switch 250. The host computer 200 can include at least one processor and memory and can host the execution of a VM relocation module 300. The VM relocation module 300 can include program code enabled upon execution in the memory of the host computer 200 to relocate selected ones of the VMs 240 in a source one of the physical machines 210 to a target one of the physical machines 210 in accordance with a computer VM mobility cost of relocating the selected ones of the VMs 240 to the target one of the physical machines 210.

The VM mobility cost of each of the selected VMs 240 can account not only for the bandwidth necessary to move the selected ones of the VMs 240 over the network, but also the memory dirty rate of the VMs 240 that remain active during the relocation process. Yet further, the VM mobility cost of each of the selected VMs 240 can account for the network topology of the physical machines 210—particularly where the physical machines 210 are arranged hierarchically through a set of switches 250. In the latter instance, the uplink ratio between the network interfaces 220 and the switch 250 is accounted for when determining maximum available bandwidth from a source one of the physical machines 210 to a target one of the physical machines 210.

Figure 3:
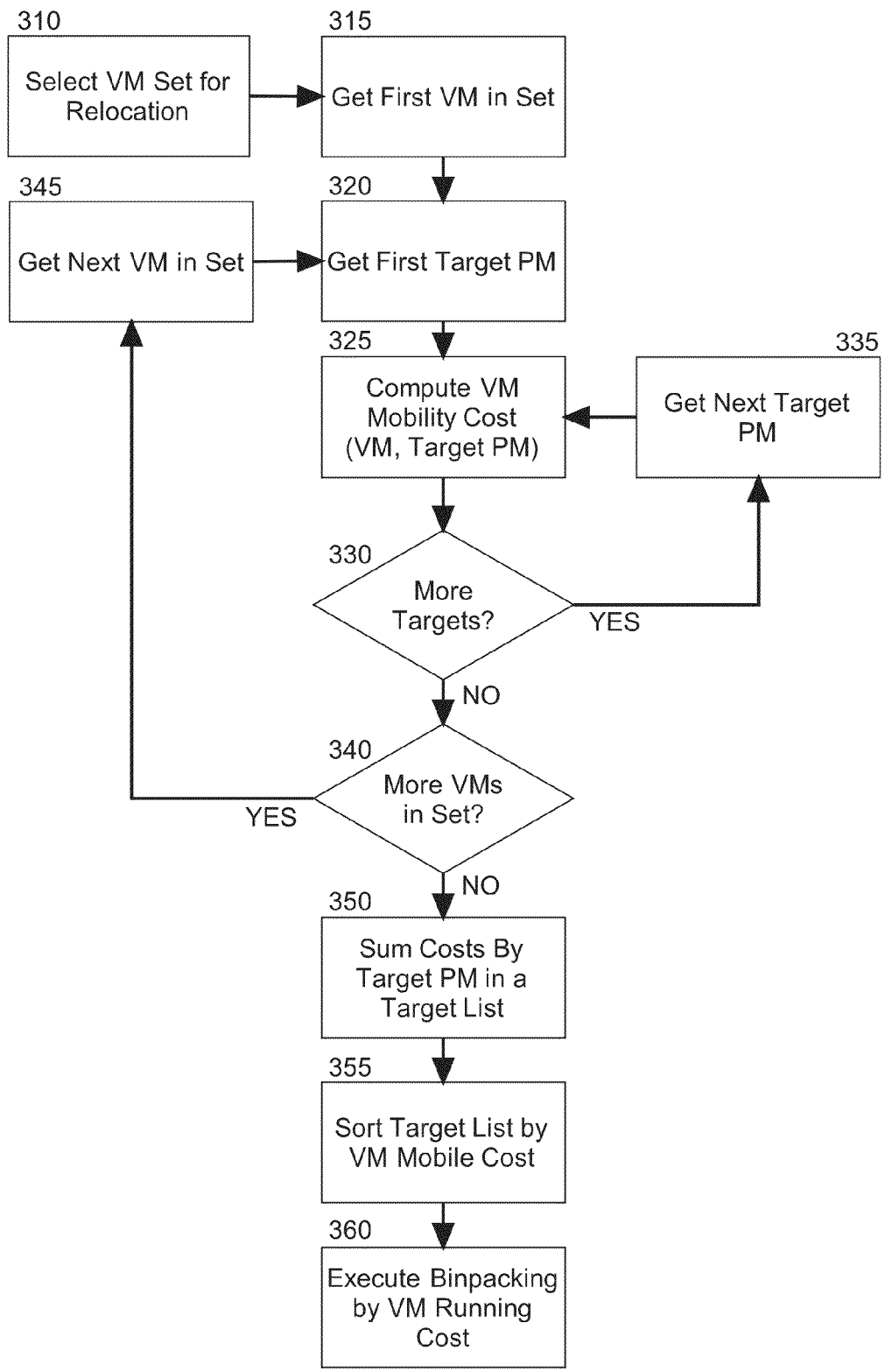

In even yet further illustration of the operation of the VM relocation module 300, FIG. 3 is a flow chart illustrating a process for intelligent VM relocation. Beginning in block 310 a set of VMs can be specified for relocation. In block 315, a first VM in the set can be selected for analysis and in block 320, a first target physical machine can be selected for analysis. In block 325, the VM mobility cost for the selected VM and target physical machine can be computed, accounting for the memory size of the selected VM, the memory dirty rate of the selected VM and the available network bandwidth of the network coupling the source physical machine hosting the selected VM, and the selected target physical machine.

In decision block 330, it can be determined whether or not additional target physical machines remain to be analyzed for the selected VM. If so, in block 335 a next target VM can be selected for analysis and the process can rerun through block 325. In decision block 330, when it is determined that no additional target physical machines remain to be analyzed for the selected VM, in decision block 340 it can be determined whether or not additional VMs remain to be analyzed in the set. If so, in block 345 a next VM in the set can be selected for analysis and the process can repeat through block 320.

In decision block 340, when it is determined that no further VMs in the set remain to be analyzed, in block 350 the individual VM mobility cost for relocating all VMs in the set to each one of the target physical machines can be computed in a list of the target physical machines. Thereafter, in block 355 the list of the target physical machines can be sorted in accordance with lowest VM mobility cost. Finally, in block 360 the VMs in the set can be relocated to the target physical machines in the list by way of binpacking utilizing the priority of target physical machines set forth in the sorted list to determine affordable VM packing based on a VM running cost. In this way, the binpacking can occur whilst accounting for VM mobility cost rather than mere VM running cost.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method for intelligent virtual machine (VM) relocation comprising:

selecting a set of VMs for relocation over a data communications network within a data center or across data centers, from one or more source physical machines to one or more target physical machines;

computing both a VM running cost for accommodating the set of the VMs and a VM mobility cost for relocating the set of the VMs from the one or more source physical machines to the one or more target physical machines;

determining whether or not the VM mobility cost exceeds available resources in the data communications network; and, relocating the set of the VMs utilizing binpacking based on VM running cost only if it is determined that the VM mobility cost does not exceed the available resources of the data communications network and that the VM running cost does not exceed the available resources of the physical machines, the binpacking comprising generating a list of target physical machines to which the VMs are able to be relocated, computing the VM mobility cost for the VMs in respect to each of the target physical machines, sorting the list based upon the computed VM mobility cost for each of the target physical machines and binpacking the VMs into the target physical machines in an order specified by the sorted list.

2. The method of claim 1, wherein the VM mobility cost comprises expected network bandwidth utilization when relocating the VMs.

3. The method of claim 2, wherein the VM mobility cost further comprises an expected page write (dirtying) rate for each of the VMs.

4. The method of claim 1, wherein the VM mobility cost further comprises an expected throughput determined according to a network topology identified for the data communications network.

5. A virtual machine (VM) utilizing data processing system configured for intelligent VM relocation comprising:

multiple different physical machines, each having a configuration to host one or more VMs, each being communicatively coupled to the other over a data communications network; and, an intelligent VM relocation module executing in memory of a computer, the module comprising program code enabled during execution to select a set of VMs for relocation over the data communications network from one or more source ones of the physical machines to one or more target ones of the physical machines, to compute in memory of the computer a VM mobility cost for relocating the set of the VMs from the one or more source ones of the physical machines to the one or more target ones of the physical machines, to determine whether or not the VM mobility cost exceeds available resources in the data communications network, and to relocate the set of the VMs utilizing binpacking only if it is determined that the VM mobility cost does not exceed the available resources of the data communications network, the binpacking comprising generating a list of target physical machines to which the VMs are able to be relocated, computing the VM mobility cost for the VMs in respect to each of the target physical machines, sorting the list based upon the computed VM mobility cost for each of the target physical machines, and binpacking the VMs into the target physical machines in an order specified by the sorted list.

6. The system of claim 5, wherein the VM mobility cost comprises expected network bandwidth utilization when relocating the VMs.

7. The system of claim 6, wherein the VM mobility cost further comprises an expected page dirtying rate for each of the VMs.

8. The system of claim 5, wherein the VM mobility cost further comprises an expected throughput determined according to a network topology identified for the data communications network.

9. The system of claim 5, wherein the binpacking comprises:

generating a list of target physical machines to which the VMs are able to be relocated;

computing the VM mobility cost for the VMs in respect to each of the target physical machines;

sorting the list based upon the computed VM mobility cost for each of the target physical machines; and, binpacking the VMs into the target physical machines in an order specified by the sorted list.

10. A computer program product for intelligent virtual machine (VM) relocation, the computer program product comprising:

a computer readable storage medium having computer readable program code embodied therewith, the computer readable program code comprising:

computer readable program code for selecting a set of VMs for relocation over a data communications network within a data center or across data centers from one or more source physical machines to one or more target physical machines;

computer readable program code for computing in memory of a computer in the data center a VM mobility cost for relocating the set of the VMs from the one or more source physical machines to the one or more target physical machines;

computer readable program code for determining whether or not the VM mobility cost exceeds available resources in the data communications network; and, computer readable program code for relocating the set of the VMs utilizing binpacking only if it is determined that the VM mobility cost does not exceed the available resources of the data communications network, the binpacking comprising generating a list of target physical machines to which the VMs are able to be relocated, computing the VM mobility cost for the VMs in respect to each of the target physical machines, sorting the list based upon the computed VM mobility cost for each of the target physical machines, and binpacking the VMs into the target physical machines in an order specified by the sorted list.

11. The computer program product of claim 10, wherein the VM mobility cost comprises expected network bandwidth utilization when relocating the VMs.

12. The computer program product of claim 11, wherein the VM mobility cost further comprises an expected page dirtying rate for each of the VMs.

13. The computer program product of claim 10, wherein the VM mobility cost further comprises an expected throughput determined according to a network topology identified for the data communications network.

* * * * *